United States Patent [19]

Iles, Sr.

[11] Patent Number: 4,758,097

[45] Date of Patent: Jul. 19, 1988

[54] APPARATUS FOR PRODUCING FROZEN CONFECTION FOODS

[75] Inventor: Robert E. Iles, Sr., Edgewater, Fla.

[73] Assignee: Dupont Instruments Corporation, Edgewater, Fla.

[21] Appl. No.: 902,791

[22] Filed: Sep. 2, 1986

[51] Int. Cl.$^4$ ............................................... A23G 9/00
[52] U.S. Cl. ...................................... 366/149; 62/342; 99/455; 366/102; 366/138
[58] Field of Search ............................ 99/452, 453–455; 366/144, 149, 309–312, 101, 102, 138; 62/135, 136, 342–344, 201, 320, 306

[56] References Cited

U.S. PATENT DOCUMENTS

| | | |
|---|---|---|
| 1,548,430 | 8/1925 | Ashley . |
| 1,779,330 | 10/1930 | Pfouts . |
| 1,882,660 | 10/1932 | Glauser . |
| 2,034,213 | 3/1936 | Smith . |
| 2,290,214 | 7/1942 | Smith, Jr. . |
| 2,294,172 | 8/1942 | Getz . |
| 2,304,579 | 12/1942 | Lindsay . |
| 2,306,714 | 12/1942 | Rowell . |
| 2,343,767 | 3/1944 | Getz . |
| 2,409,067 | 10/1946 | Reed . |
| 2,651,186 | 9/1953 | Murphy . |
| 2,657,024 | 10/1953 | Reinecke . |
| 2,713,253 | 7/1955 | Chandler . |
| 2,924,952 | 2/1960 | Swenson et al. . |
| 3,004,404 | 10/1961 | Newby . |
| 3,044,878 | 7/1962 | Knedlik . |
| 3,183,681 | 5/1965 | Lutz et al. . |
| 3,222,035 | 12/1965 | Lutz et al. . |
| 3,365,903 | 1/1968 | Lutz et al. . |
| 3,402,562 | 9/1968 | Menzel . |
| 3,402,567 | 9/1968 | Menzel . |
| 3,409,217 | 11/1968 | Gentry . |
| 3,503,757 | 3/1970 | Rubenstein . |
| 3,545,063 | 12/1970 | Mitchell . |
| 3,626,709 | 12/1971 | Yuza . |
| 3,638,448 | 8/1972 | Raymer . |
| 3,642,174 | 2/1972 | Cornelius . |
| 3,656,316 | 4/1972 | Stock . |
| 3,660,988 | 5/1972 | Garavelli . |
| 3,802,217 | 4/1974 | Garavelli . |
| 3,811,494 | 5/1974 | Menzel . |
| 3,898,859 | 8/1975 | Duke . |
| 3,930,535 | 1/1976 | Menzel ............................. 62/342 X |
| 4,157,017 | 6/1979 | Reid . |
| 4,201,558 | 5/1980 | Schwitters et al. . |
| 4,221,117 | 9/1980 | Martineau . |
| 4,241,590 | 12/1980 | Martineau . |
| 4,488,817 | 12/1984 | Uesaka et al. . |
| 4,573,329 | 6/1984 | Cavalli . |

Primary Examiner—Timothy F. Simone
Attorney, Agent, or Firm—Jacox & Meckstroth

[57] ABSTRACT

A machine for producing frozen confection products. A frozen confection product may be a dairy based product or a non-dairy based product, or a synthetic type of product, or the like. It may be fruit flavored, carbonated, non-carbonated, or alcholic in nature. It may be of the type referred to as soft serve ice cream. The machine includes a freeze unit provided with a freeze chamber into which a gas and a food material flow. The gas and the food material are mixed within the freeze chamber. The freeze chamber has an inner wall and an outer wall. A refrigerant flows between the inner wall and the outer wall. A coil, snugly positioned between the inner wall and the outer wall, controls flow of refrigerant and limits the volume of refrigerant necessary to obtain maximum effectiveness of the refrigerant. Within the freeze chamber are rotatable mixer elements which mix the gas and the food material and enhance volumetric expansion of the mixture to produce a food product. A valve controls flow of the food product from the freeze chamber.

15 Claims, 5 Drawing Sheets

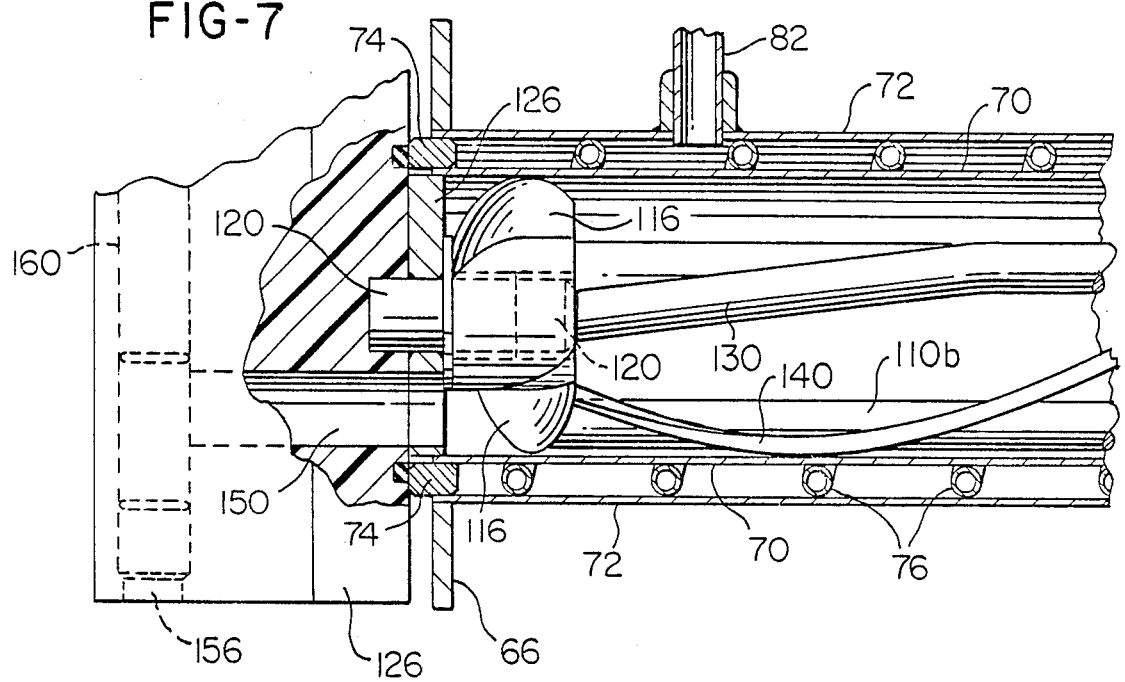
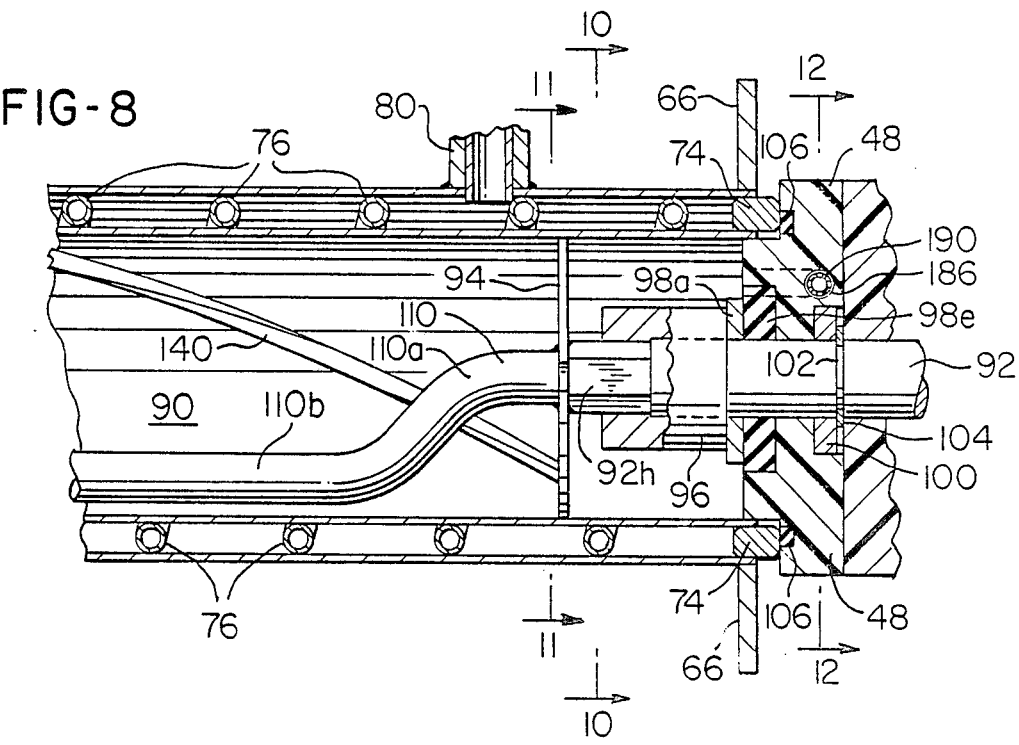
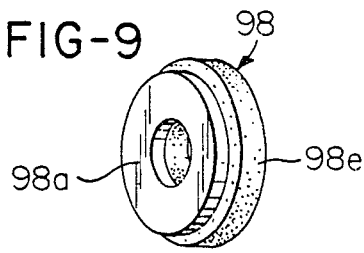

APPARATUS FOR PRODUCING FROZEN CONFECTION FOODS

BACKGROUND OF THE INVENTION

Several types of machines have been constructed and used to produce and dispense frozen confection products, such as, for example, "soft ice cream", milk shakes, etc.

Known types of such machines are shown in the following U.S. Pat. Nos.: 1,548,430, 2,290,214, 2,294,172, 2,304,579, 2,343,767, 2,409,067, 2,713,253, 3,004,404, 4,157,017, 2,306,714, 2,657,024, 3,044,878, 3,503,757, 3,642,174, 2,924,952, 3,638,448, 3,656,316, 3,802,217, 3,898,859, 4,573,329, and 2,924,952.

Numerous problems have occurred in the use of such machines. Many of such machines are not capable of producing a wide variety of frozen confection products. Many of such machines have bacteria problems. Many of such machines are difficult to clean properly. Many of such machines are not capable of maintaining consistency in the quality of the product produced. Some of such machines are not capable of both coin operation and operator operation. Many of such machines are not efficient in operation. Many of such machines do not have the capability of operator control of the characteristics of the product. Many of such machines experience problems in maintaining a product in proper condition if a period of several hours occurs during which there is no dispensing the product. Many of such machines experience leakage of the product. Many of such machines have a tendency to freeze up or melt down.

Many of such machines are not adaptable for support either upon both a counter and a floor.

Many of such machines do not have the capability of accurate dispensing of a food product.

It is an object of this invention to provide apparatus which is capable of producing numerous types of frozen confection food products.

It is another object of this invention to provide such apparatus which overcomes the problems set forth above.

Other objects and advantages of this invention reside in the construction of parts, the combination thereof, the method of construction and the mode of operation, as will become more apparent from the following description.

SUMMARY OF THE INVENTION

Apparatus of this invention for producing frozen confection foods comprises a freeze unit which includes an inner cylindrical wall and an outer cylindrical wall, the outer cylindrical wall encompasses the inner cylindrical wall and is coaxial therewith, and is spaced therefrom. The inner cylindrical wall forms a freeze chamber. Snugly positioned between the inner cylindrical wall and the outer cylindrical wall is a helical coil having spaced-apart convolutions. A refrigerant flows along the cylindrical walls and between the convolutions of the helical coil for refrigerating the freeze chamber.

A food ingredient and a whipping gas flow into the freeze chamber and are blended together as they enter the freeze chamber. Mixer elements rotate within the chamber and further mix the whipping gas and the food ingredient and cause inflation of the volume of the mixture. The mixer elements include a plurality of auger elements. Also, preferably, within the chamber is a stationary mixer element which cooperates with the rotating mixer elements, in causing significant expansion in the volume of the mixture.

A discharge conduit is provided for flow of the mixed and frozen food product from the chamber. A valve in the conduit controls the flow of the mixture from the chamber. One of the rotating mixer elements is operable to meter quantities of the mixture as they flow from the freeze chamber into the discharge conduit.

BRIEF DESCRIPTION OF THE VIEWS OF THE DRAWINGS

FIG. 7 is an enlarged sectional view, showing a portion of the apparatus illustrated in FIG. 4.

FIG. 8 is an enlarged sectional view, showing another portion of the apparatus illustrated in FIG. 4.

FIG. 9 is a perspective view, drawn on substantially the same scale as FIG. 8 showing a sealing member of the apparatus.

DETAILED DESCRIPTION OF THE PREFERRED EMBODIMENT

Figure 1:
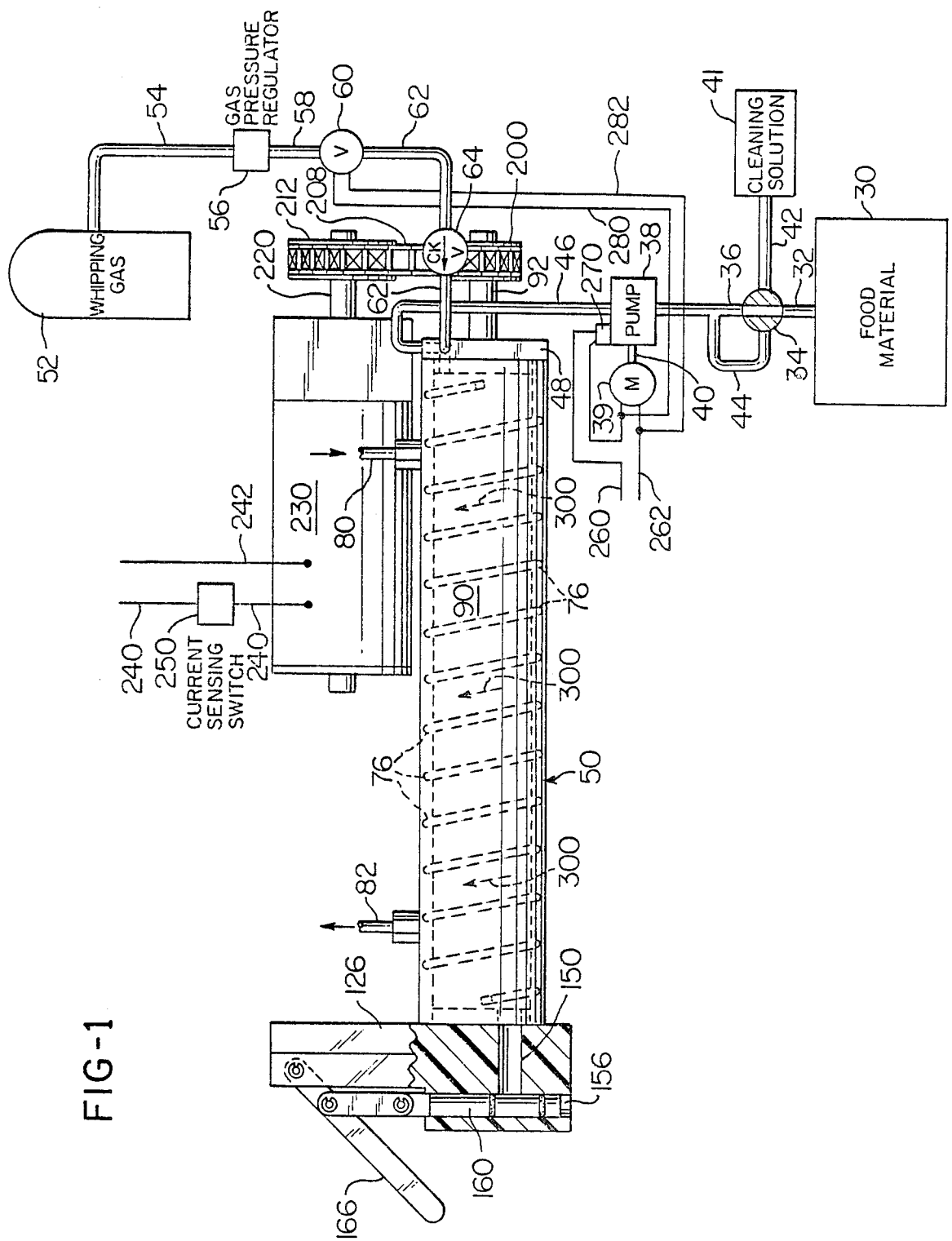
FIG. 1 is a diagrammatic type of view, illustrating the apparatus of this invention.

FIG. 1 shows diagrammatically the apparatus of this invention for producing frozen confection foods A container 30 contains a quantity of flowable food material. A conduit 32 connects the container 30 to a two-way valve 34. A conduit 36 joins the valve 34 to a pump 38, which is driven by a motor 39, through a shaft 40. A container 41 contains a cleaning solution and is joined to the two-way valve 34 by means of a conduit 42. A by-pass conduit 44 joins the two-way valve 34 to the conduit 36. A conduit 46 joins the pump 38 to an injector block 48 of a freeze unit 50.

A container 52 contains an edible whipping gas, such as, for example, a mixture of nitrous oxide and edible Freon. A conduit 54 joins the container 52 to a pressure regulator valve 56. A conduit 58 connects the pressure regulator valve 56 to an electrically operable control valve 60. The control valve 60 is connected to a conduit 62, which is connected to the injector block 48 through a check valve 64.

Figure 2:
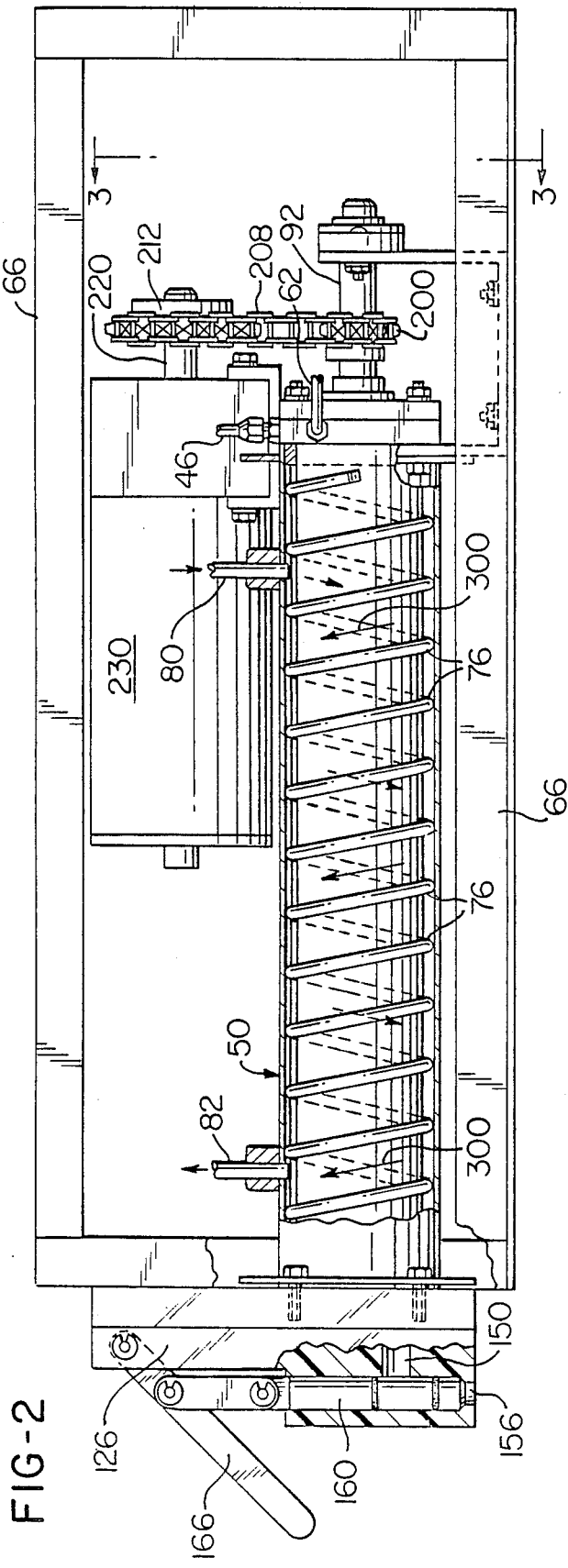
FIG. 2 is a side sectional view, with parts broken away and shown in section, of a major portion of the apparatus illustrated in FIG. 1.
Figure 3:
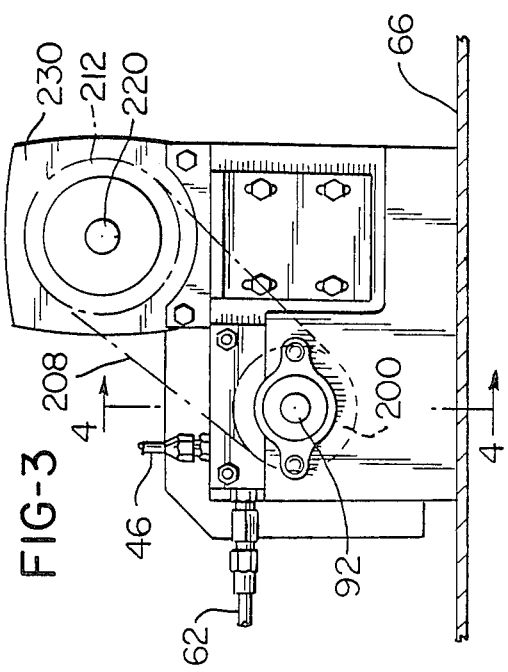
FIG. 3 is a sectional view, taken substantially on line 3—3 of FIG. 2.
Figure 6:
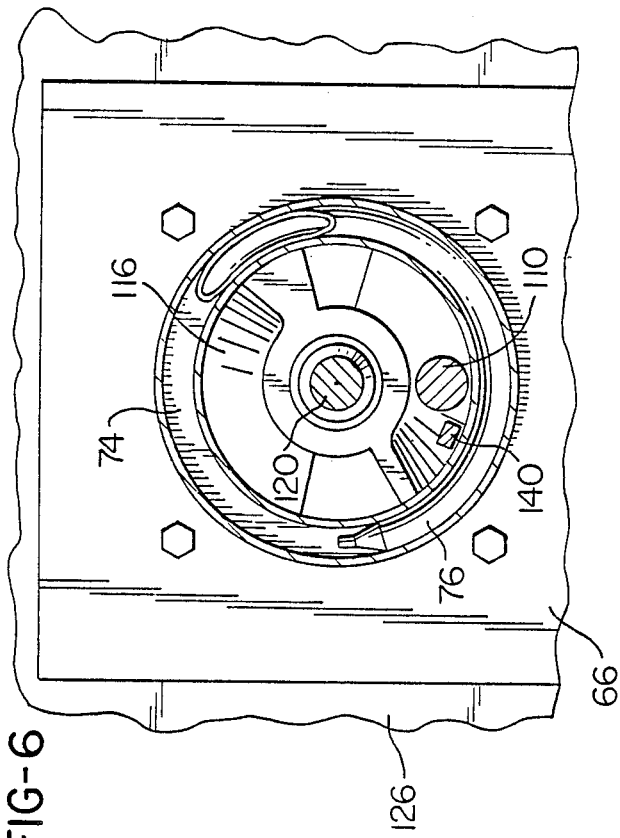
FIG. 6 is an enlarged sectional view, taken substantially on line 6—6 of FIG. 4.
Figure 5:
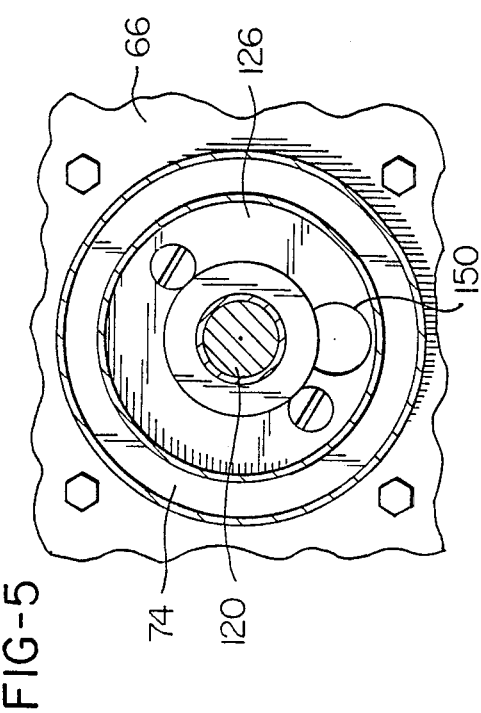
FIG. 5 is an enlarged sectional view, taken substantially on line 5—5 of FIG. 4.
Figure 4:
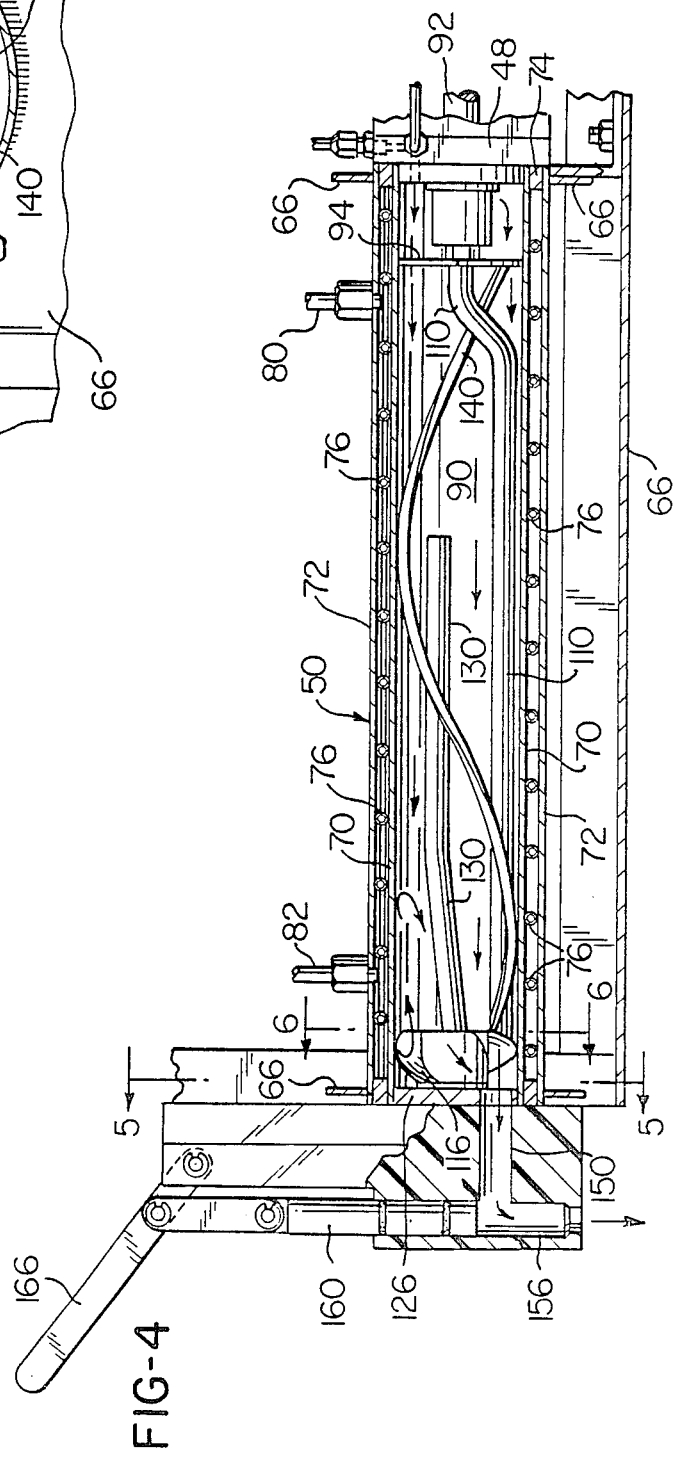
FIG. 4 is a sectional view, taken substantially on line 4—4 of FIG. 3.
Figure 10:
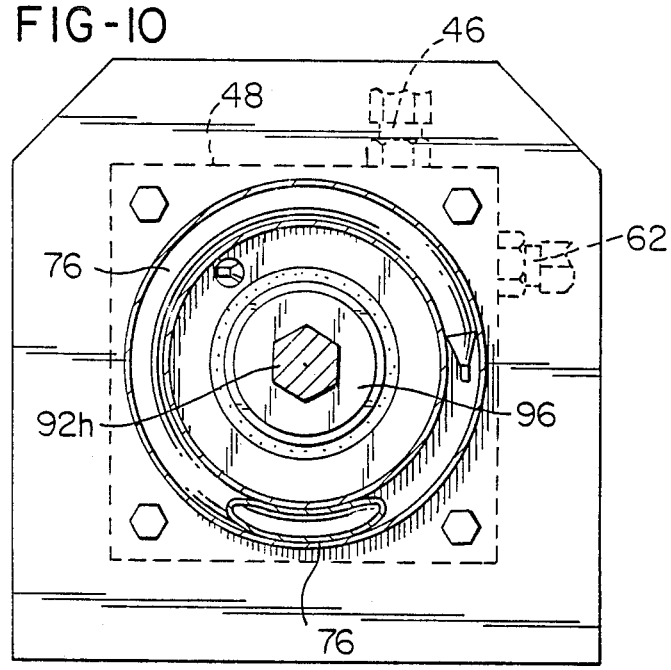
FIG. 10 is a sectional view, taken substantially on line 10—10 of FIG. 8.

As best shown in FIGS. 2 and 4, the freeze unit 50 is shown supported by base structure 66.

The freeze unit 50 comprises an inner cylinder 70 and an outer cylinder 72. The cylinders 70 and 72 are coaxial and are shown as having the same length. A spacer ring 74 at each end of the cylinders 70 and 72 maintains the spacing therebetween. Between the cylinders 70 and 72 and extending therealong is a tubular coil 76, having spaced-apart convolutions. The coil 76 is shown as being sealed at each end thereof and has a gas therein, preferably air.

Attached to the outer cylinder 72 and in communication with the space between the cylinders 70 and 72 is an inlet conduit 80. The inlet conduit 80 leads to a space between adjacent convolutions of the coil 76. Also, attached to the outer cylinder 72 and in communication with the space between the cylinders 70 and 72 is an outlet conduit 82. The outlet conduit 82 leads to a space between adjacent convolutions of the coil 76. The inner cylinder 70 forms an elongate chamber 90.

Figure 11:
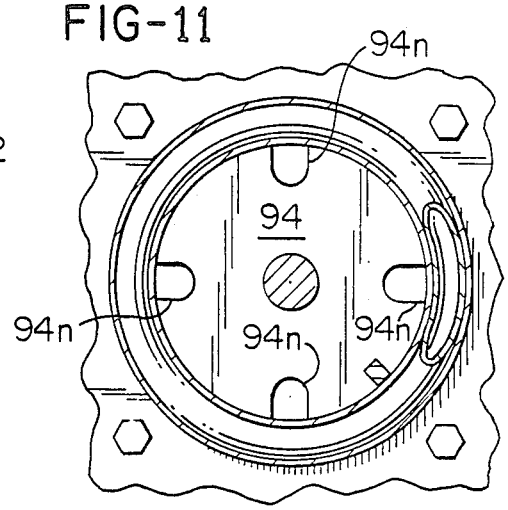
FIG. 11 is a sectional view, taken substantially on line 11—11 of FIG. 8.
Figure 13:
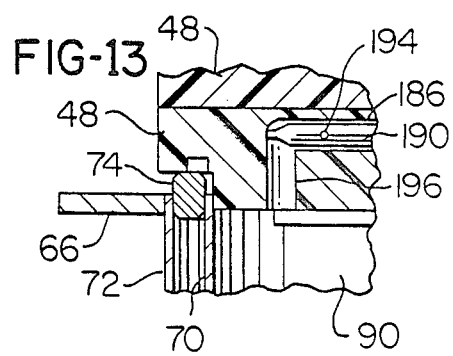
FIG. 13 is a sectional view, taken substantially on line 13—13 of FIG. 12.

The injector block 48 is attached to the cylinders 70 and 72 at one end thereof. Extending into the chamber 90 through the injector block 48 is a drive shaft 92. The drive shaft 92 is shown as being provided with a hexagonal end portion 92h. A splash plate 94 is attached to the end portion 92h of the drive shaft 92. As best shown in FIG. 11, the splash plate 94 is provided with a plurality of spaced-apart peripherical notches or openings 94n. The splash plate 94 is coaxial with the shaft 92 and has a diameter which is slightly less than the diameter of the chamber 90, so that the splash plate 94 closely fits within the chamber 90 and is rotatable within the chamber 90 with rotation of the drive shaft 92.

Encompassing the hexagonal portion 92h of the shaft 92 is a rigid collar 96, which is secured to the shaft 92 and to the portion 92h. Also, encompassing the shaft 92 is a sealing member 98, which is shown in perspective in FIG. 9, and which is shown in section in FIG. 8. The seal member 98 has a rigid anti-friction portion 98a and an elastomeric portion 98e. The rigid portion 98a and the elastomeric portion 98e are relatively axially movable. A spring member, not shown, within the sealing member 98 and between the rigid portion 98a and the elastomeric portion 98e urges the rigid portion 98a from the elastomeric portion 98e. The rigid collar 96 engages the anti-friction portion 98a, which is exterior of the injector block 48. The elastomeric portion 98e of the sealing member 98 is embedded within the injector block 48. Also encompassing the shaft 92 and embedded within the injector block 48 is a bearing member 100. The shaft 92 has a peripheral groove 102 within which a snap ring 104 is positioned and which retains the axial position of the shaft 92 with respect to the injector block 48, and the snap ring 104 maintains the collar 96 in firm engagement with the rigid portion 98a of the sealing member 98. Thus, the shaft 92 is excellently sealed against leakage from the chamber 90.

An elastomeric sealing ring 106, embedded within the injector block 48 engages the spacer ring 74, as shown in FIG. 8.

Attached to the splash plate 94 and extending therefrom is a rod type auger 110. The auger 110 has a part 110a which extends angularly from the splash plate 94. The auger 110 has a substantially straight portion 110b which extends from the part 110a thereof, adjacent the inner wall of the cylinder 70, to an impeller 116, which is at the end of the cylinder 70, opposite the shaft 92. The impeller 116 has a plurality of angular curved blades. The impeller 116 is rotatably mounted upon a fixed shaft 120, which is mounted in an end wall 126.

Secured to the fixed shaft 120 and extending into the chamber 90 is a rigid stem 130, which, as best shown in FIG. 4, has a part which is angular to the central axis of the cylinder 70, and a part which is substantially straight and spaced from the central axis of the cylinder 70 and parallel thereto.

Attached to the splash plate 94 and to the impeller 116 is a helical auger 140, which encompasses the central axis of the cylinder 70 and has portions adjacent the inner surface of the cylinder 70.

As shown in FIGS. 2, 4, 5, and 7, the end wall 126 has a substantially horizontal passage 150 therein. The passage 150 leads from the chamber 90 to a substantially vertical passage 156. Axially movable within the passage 156 is a valve member 160, which is operable by means of a pivotal handle 166.

Figure 12:
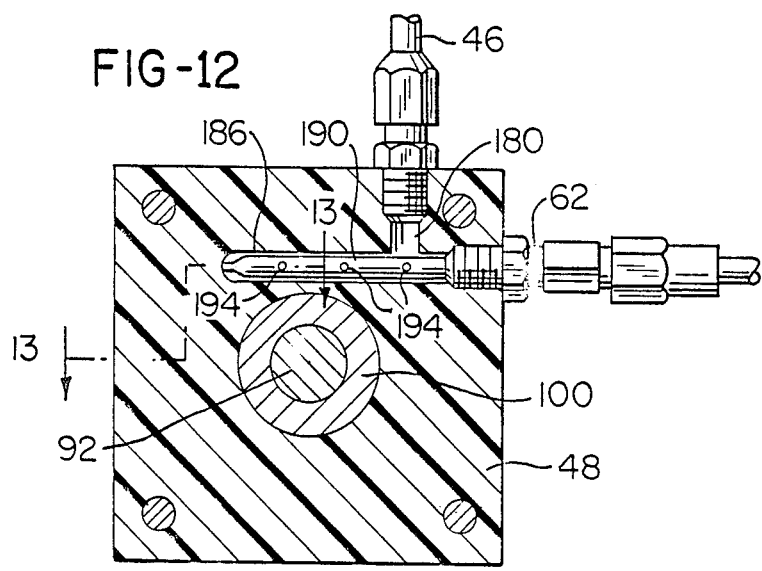
FIG. 12 is a sectional view, taken substantially on line 12—12 of FIG. 8.

As stated above, the conduit 46 joins the pump 38 to the injector block 48. FIG. 12 shows in detail the connection of the conduit 46 to the injector block 48. The conduit 46 is in communication with a passage 180 within the injector block 48. The passage 180 joins a passage 186, which is in communication with the conduit 62. The passage 186 is shown as being substantially normal to the passage 180. However, this angular relationship is not required.

Figure 14:
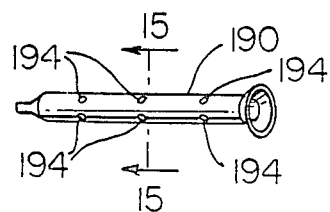
FIG. 14 is a perspective view, illustrating a portion of the apparatus shown in FIGS. 12 and 13.
Figure 15:
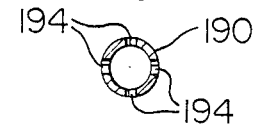
FIG. 15 is an enlarged sectional view, taken substantially on line 15—15 of FIG. 14.

Within the passage 186 and connected to the conduit 62 is an elongate nozzle element 190, which is closed at the end thereof and which has a plurality of orifices 194 therein, as best shown in FIGS. 12, 14, and 15. The passage 186 joins a passage 196 which is in communication with the chamber 90 within the cylinder 70.

Attached to the drive shaft 92 exterior of the freeze unit 50 is a sprocket wheel 200 which is encompassed by a chain 208. The chain 208 also encompasses a sprocket wheel 212, which is attached to a shaft 220 of an electric motor 230. The motor 230 is shown supported by the base structure 66 adjacent the freeze unit 50.

As shown in FIG. 1, electric conductors 240 and 242 are connected to the motor 230 for energization thereof. Connected to the electric conductor 240 is a current sensing switch 250.

Electric conductors 260 and 262 are connected to the motor 39 for energization thereof. Connected to the conductor 260 is a pressure operable switch 270. The pressure operable switch 270 is in communication with the interior of the pump 38 and senses the pressure within the pump 38.

Connected to the electrical conductors 260 and 262, adjacent the motor 39, are electrical conductors 280 and 282, which are connected to the electrically operated valve 60.

Operation

Food material is pumped by the pump 34 and flows through the conduit 46 and into the injector block 48 of the freeze unit 50. As stated and shown, the electric conductors 280 and 282, which are connected to the electrically operated valve 60, are also connected to the electric conductors 260 and 262 adjacent the motor 39. Therefore, when the motor 39 is energized, for operating the pump 38, the electrically operated valve 60 is also energized. Therefore, when the pump 38 operates and food material moves to the injector block 48 through the conduit 46, the valve 60 is open and whipping gas also flows to the injector block 48 through the conduit 62. The whipping gas flows into the injector block 48 and into the nozzle 190. The gas flows outwardly from the nozzle 190 through the orifices 194. While this flow of gas occurs from the nozzle 190, food material flows over the nozzle 190, as the food material enters the injector block 48 through the conduit 46 and the passage 180. Thus, as this occurs, streams of whipping gas move into the food material, and the food material and the whipping gas are mixed.

The mixture of food material and whipping gas enters the chamber 90 through the passage 196. The mixture strikes the splash plate 94 and is reflected momentarily therefrom. This reflection causes additional mixing of the mixture. The mixture then travels through the notches 94n in the splash plate 94 and into the portion of the chamber 90 within which the augers 110 and 140 and the stem 130 are located. The mixture of the food material and the whipping gas moves in a direction away from the splash plate 94. The rotating augers 110 and 140 cause additional mixing of the mixture as the mixture is moved with respect to the stationary stem 130 and engages the stationary stem 130. As the mixture engages the impeller 116, at least portions of the mixture are forced back toward the splash plate 94. Such action causes additional mixing and inflation and volumetric expansion of the mixture, as illustrated in FIG. 4.

The pressure of the mixture within the chamber 90 increases as the food material and the whipping gas enters the chamber 90 and as mixing action continues. As the pressure within the chamber 90 increases, the work load upon the motor 230 increases, as the motor 230 rotates the augers 110 and 140, through the drive shaft 92. Thus, the electric current flow to the motor 230 through the conductors 240 and 242 increases. The electric current flow through the conductors 240 and 242 is sensed by the current sensing switch 250. When the electric current in the conductors 240 and 242 reaches a maximum predetermined value, the current sensing switch 250 opens and electric current flow to the motor 230 ceases, and the motor 230 stops and the drive shaft 92 ceases to rotate. Thus, the augers 110 and 140 cease to rotate, and mixing action within the chamber 90 ceases.

Also, the pressure within the chamber 90 is sensed by the pump 38 and the pressure operable switch 270, as the pressure operable switch 270 senses the pressure within the pump 38. When a predetermined maximum pressure is sensed by the pressure operable switch 270, the switch 270 opens and electric current flow to the motor 39 ceases. Thus, operation of the pump 38 ceases, and there is no additional flow of the food material into the injector block 48.

As stated and as shown, the electrical conductors 280 and 282 are connected to the conductors 260 and 262 adjacent the motor 39. Thus, when the conductors 260 and 262 are deenergized, stopping the motor 39, the conductors 280 and 282 are also deenergized, and the electrically operated valve 60 is deenergized, and the valve 60 closes. Thus, flow of whipping gas to the injector block 48 ceases.

When the valve 160 closes the passage 156 as shown in FIGS. 1 and 2, the mixture cannot flow from the freeze unit 50. However, when the handle 166 is raised, as illustrated in FIG. 4, the valve 160 is raised and opens the passage 156, and quantities of the mixture flow from the chamber 90 through the passage 150 and through the passage 156.

When quantities of the mixture begin to flow from the chamber 90 through the passages 150 and 156, the pressure of the mixture within the chamber 90 decreases. The decrease in pressure is sensed by the pressure sensing switch 270, and the switch 270 closes. Therefore, the motor 39 is again energized and the valve 60 is again energized. Thus, the pump 38 again operates, and food material flows into the injector block 48 and gas flow through the valve 60 and to the injection block 48 again occurs. Thus, food material and gas again flow into the injector block 48 and into the freeze chamber 90.

Also, when the pressure within the chamber decreases to a predetermined value, the force of the motor 230, tending to rotate the drive shaft 92 decreases. Thus, the current necessary to operate the motor 230 decreases, and the current sensing switch 250 again closes and sufficient current is provided to the motor 230 for operation thereof. Thus, the augers 110 and 140 are again rotated to cause mixing action within the chamber 90.

The impeller 116 is rotated as the augers 110 and 140 rotate. As the mixture flows from the chamber 90 through the passage 150 the mixture flows past the impeller 116. As the impeller 116 rotates, the blades thereof sever the moving stream mixture. Thus, with each rotation of the impeller 116, a predetermined quantity of the product mixture flows into the passage 150, as a blade of the impeller 116 severs the stream of the mixture into predetermined quantities. Thus, a predetermined quantity of the product mixture is determined with each revolution of the impeller 116. This operation is particularly important when the apparatus of this invention is coin operated and is also useful when the apparatus is operator operated.

As illustrated in FIGS. 1, 2, 4, 7, and 8 fluid conduits 80 and 82 are in communication with the space between the inner cylinder 70 and the outer cylinder 72. As shown and as discussed, the coil 76 and the inner cylinder 70 and the outer cylinder 72 form a helical conduit for flow of refrigerant from the inlet conduit 80 to the outlet conduit 82. A refrigerant, such as, for example, Freon, flows through the conduit 80 and enters the space between the cylinder 70 and the cylinder 72. The refrigerant flows between adjacent convolutions of the coil 76. The refrigerant thus flows around the inner cylinder 70 in a helical path and flows outwardly from the space between the cylinders 70 and 72, through the conduit 82. Thus, substantially the entire surface of the inner cylinder 70 is refrigerated and excellent freezing action is provided to the chamber 90 within the inner cylinder 70.

As stated and as shown, the convolutions of the coil 76 between the inner cylinder 70 and the outer cylinder 72 form a limited area conduit for flow of refrigerant along and around the inner cylinder 70, as illustrated by arrows 300 in FIGS. 1 and 2. Therefore, the volume of refrigerant can be a minimum and a high degree of efficiency of operation occurs.

Also, the convolutions of the coil 76 serve to absorb sudden changes in temperature conditions, so that expansion and contraction occurs within the coil 76, rather than in the inner cylinder 70. Thus, the diameter of the inner cylinder 70 remains substantially constant, even though significant temperature changes may occur in the space between the inner cylinder 70 and the outer cylinder 72. Therefore, the spacing of the augers 110 and 140 within the chamber 90, with respect to the inner surface of the inner cylinder 70, remains constant. The spacing between the augers 110 and 140 and the inner surface of the cylinder 70 can be very minimal. Therefore, excellent mixing action occurs within the chamber 90 even though sudden temperature changes may occur in this space between the inner cylinder 70 and the outer cylinder 72.

When it is desired to clean the conduits 46 and the pump 38, and the freeze unit 50, the valve 34 is rotated ninety degrees. Then the pump 38 is operated for flow of cleaning solution from the container 41 through the by-pass conduit 44, through the conduit 46 and through the freeze unit 50. Thus, a cleaning operation can be performed readily and quickly and without removal of parts of the apparatus.

Thus, it is understood that the objects set forth above are accomplished by the apparatus of this invention.

Although the preferred embodiment of the apparatus of this invention has been described, it will be understood that within the purview of this invention various changes may be made in the form, details, proportion and arrangement of parts, the combination thereof, and the mode of operation, which generally stated consist in an apparatus for producing frozen confection foods within the scope of the appended claims.

The invention having thus been described, the following is claimed.

1. In apparatus for producing frozen confection food products which are produced from flowable food material and an edible gaseous material comprising: a freeze unit including an inner cylindrical wall, the inner cylindrical wall forming a cylindrical freeze chamber, an outer cylindrical wall, the outer cylindrical wall encompassing the inner cylindrical wall and being coaxial therewith and spaced therefrom, an elongate helical tubular coil having spaced-apart convolutions closely encompassing the inner cylindrical wall and extending along the inner cylindrical wall, the helical tubular coil being closely emcompassed by the outer cylindrical wall, a gas within the helical coil, the inner cylindrical wall and the outer cylindrical wall and the elongate helical tubular coil thus forming a helical channel along the cylindrical walls, inlet means in communication with the helical channel for introducing a refrigerant fluid into the helical channel, the elongate helical tubular coil expanding and contracting with changes in temperature within the helical channel and within the cylindrical freeze chamber, whereby expansion and contraction occurs primarily in the elongate tubular coil rather than in the inner cylinder, outlet means in communication with the helical channel and spaced from the inlet means for flow of refrigerant fluid from the helical channel, first fluid introduction means, the first fluid introduction means introducing an edible gaseous material into the freeze chamber formed by the inner cylindrical wall, second fluid introduction means, the second fluid introduction means introducing flowable food material into the freeze chamber formed by the inner cylindrical wall, a portion of the first fluid introduction means being in juxtaposition with a portion of the second fluid introduction means, the first fluid introduction means having a passage in communication with the second fluid introduction means for flow of gaseous material into the flowable food material, wherein the edible gaseous material and the flowable food material are mixed and volumetric expansion of the mixture occurs within the fluid introduction means and volumetric expansion continues as the mixture of the material flows from the fluid introduction means and flows into the freeze chambers formed by the inner cylindrical wall, rotatable mixer means within the freeze chamber for continued mixing and expansion of the mixture of the flowable food material and the gases material within the freeze chamber, wherein the mixture of the flowable food material and the gaseous material expands in volume to a greater extent within the freeze chamber, and outlet means in communication with the freeze chamber for flow of the mixture of the food material and gaseous material as a frozen confection food product from the freeze chamber.

2. The apparatus of claim 1 which includes means forming an entrance chamber in communication with the freeze chamber, the first fluid introduction means including first fluid conduit means in communication with the entrance chamber for flow of edible gaseous material into the entrance chamber, the first fluid conduit means including a gas flow control wall element having opposed first and second surfaces and provided with a plurality of orifices through which the gaseous material flows from the first surface to the second surface and into the entrance chamber, the second fluid introduction means including second fluid conduit means in communication with the entrance chamber for directing flowable food material into contact with the second surface of the flow control wall element, wherein streams of gaseous material flow through the orifices and into the flowable food material for mixing the edible gaseous material with the flowable food material and creating volumetric expansion of the mixture of the gaseous material and the flowable food material.

3. The apparatus of claim 1 which includes means forming an entrance chamber in communication with the freeze chamber, the first fluid introduction means including first fluid conduit means in communication with the entrance chamber for flow of edible gaseous material into the entrance chamber, the first fluid conduit means including an elongate nozzle element within the entrance chamber, the nozzle element having a plurality of orifices along the length thereof for directing streams of edible gaseous material into the entrance chamber, the entrance chamber including the second fluid introduction means whereby flowable food material flows within the entrance chamber and flows in contact with the nozzle element along the length thereof, whereby streams of the edible gaseous material flow from the orifices of the nozzle element and into the flowable food material as the flowable food material flows in contact with the nozzle element, the edible gaseous material and the flowable food material thus being mixed and expanding in volume within the entrance chamber.

4. The apparatus of claim 1 in which the cylindrical walls have end portions which are closed by a first end closure portion and a second end closure portion, and in which the rotatable mixer means includes a rotatable drive shaft which extends through the first end closure portion of the cylindrical walls and in which at least a part of the drive shaft is within the freeze chamber formed by the inner cylindrical wall, a second shaft, the second shaft being supported by the second end closure portion of the cylindrical walls and having at least a part thereof within the freeze chamber, the mixer means also including a helical auger rotatable about the central axis of the inner cylindrical wall, the mixer means also including an offset auger, the offset auger having a relatively straight portion spaced from the axis of rotation of the helical auger, the relatively straight portion of the offset auger also being spaced from the inner cylindrical wall, means attaching the helical auger and the offset auger to the drive shaft for rotation therewith, and support means supported by the second shaft and joined to the helical auger and to the offset auger.

5. The apparatus of claim 1 in which the cylindrical walls have a first end closure portion and a second end closure portion, and in which the rotatable mixer means includes a rotatable drive shaft supported by the first end closure portion of the cylindrical walls and in which at least a part of the drive shaft is within the freeze chamber, a helical auger and an offset auger, means attaching the helical auger and the offset auger to the drive shaft for rotation therewith, a stationary secondary shaft supported by the second end closure portion of the cylindrical walls and having at least a part thereof within the freeze chamber, the mixer means also including a curved surface blade element supported by the secondary shaft, the helical auger and the offset auger being attached to the curved surface blade element for simultaneous rotation of the helical auger and the offset auger and the curved surface blade mixer element, and a stationary stem fixedly supported by the secondary shaft and extending into the freeze chamber, the helical auger and the offset auger rotating about the stationary stem.

6. The apparatus of claim 1 in which the cylindrical walls are closed by end closure means, support means carried by the end closure means for supporting the rotatable mixer means, the end closure means including said first first introduction means and said second fluid introduction means.

7. The apparatus of claim 1 in which the cylindrical walls are closed by a first end closure wall and a second end closure wall, the first fluid introduction means to the second fluid introduction means being within the first end closure wall, means forming an entrance chamber within the first end closure wall and in communication with the freeze chamber, the first fluid introduction means including nozzle means within the entrance chamber, the nozzle means having a plurality of orifices, gaseous material flowing from the orifices and into the entrance chamber, the second fluid introduction means encompassing the first fluid introduction means and directing flow of flowable food material into contact with the nozzle means, whreby gaseous material flows in streams from the orifices and into the flowable food material, and whereby the gaseous material and the flowable food material are mixed and expand in volume as the flowable food material flows in contact with the nozzle means.

8. The apparatus of claim 1 in which the second fluid introduction means includes pump means, electric motor means, connector means connecting the electric motor means to the pump means for operation of the pump means, and in which the second fluid introduction means includes electrically operable valve means for energization of the electric motor means and the electrically operable valve means, electric conductor means joined to the electric motor means and to the electrically operable valve means, the electric conductor means including pump pressure sensing means which senses the pressure applied by the pump means, whereby the electric motor means and the electrically operable valve means are deenergized when the pump pressure is of a predetermined value and whereby the electric motor means and the electrically operable valve means are energized when the pump pressure is of a predetermined value.

9. The apparatus of claim 1 which includes valve means, a source of flowable food material and a source of cleaning material, means connecting the source of cleaning material to the valve means and means connecting the source of flowable food material to the valve means, means connecting the valve means to the second fluid introduction means, whereby the valve means is operable for directing flow of flowable food material to the second fluid introduction means and thence to the freeze chamber for mixing the flowable food material with an edible gaseous material, and whereby the valve means is operable for flow of cleaning material to the second fluid introduction means and thence to the freeze chamber for cleaning the second fluid introduction means and the freeze chamber.

10. The apparatus of claim 1 which includes an end closure wall closing the cylindrical walls, a rotatable drive shaft extending through the end closure wall and into the freeze chamber, means attaching the rotatable mixer means to the rotatable drive shaft for rotation of the rotatable mixer means, a collar encompassing the drive shaft and attached thereto within the freeze chamber, a seal member encompassing the drive shaft, the seal member having a rigid anti-friction portion and an elastomeric portion, the elastomeric portion of the seal member being attached to the end closure wall, the rigid anti-friction portion of the seal member being in engagement with the collar which encompasses the drive shaft, and positioner means attached to the drive shaft, bearing means attached to the end closure wall, the positioner means being in engagement with the bearing member, whereby the drive shaft is axially positioned with respect to the end closure wall and the collar is maintained in engagement with the rigid portion of the seal member, whereby the drive shaft and the end closure wall are sealed against flow of fluid from the freeze chamber and sealed against flow of fluid between the drive shaft and the end closure wall.

11. The appartus of claim 1 which includes a fixed stem positioned within the cylindrical freeze chamber and extending along a substantial portion thereof and spaced from the central axis of the cylindrical freeze chamber, the mixer means including auger means rotatable about the fixed stem.

12. Apparatus for producing frozen confection food products from flowable food material and edible gaseous material, comprising: an inner cylinder, the inner cylinder forming a freeze chamber, an outer cylinder encompassing the inner cylinder and coaxial therewith and spaced therefrom, wherein a space is provided between the inner cylinder and the outer cylinder, a helical tubular coil positioned in the space between the inner cylinder and the outer cylinder, the helical tubular coil having spaced-apart convolutions encompassing the inner cylinder and encompassed by the outer cylinder, the inner cylinder and the outer cylinder and the helical tubular coil thus forming a helical channel in the space between the inner cylinder and the outer cylinder, a gas within the helical tubular coil, a first fluid conductor in communication with the helical channel, a second fluid conductor in communication with the helical channel and spaced form the first fluid conduit, the first fluid conductor conducting refrigerant fluid into the helical channel for flow of refrigerant within the helical channel, the second fluid conductor conducting refrigerant fluid from the helical channel, the freeze chamber which is formed by the inner cylinder having an entrance portion and an exit portion, a perforated nozzle within the entrance portion for transmission of edible gaseous material into the inner cylinder through the entrance portion, a conduit within the entrance portion, the conduit encompassing the perforated nozzle for directing flowable food material into contact with the perforated nozzle, whereby streams of edible gaseous material flow from the perforated nozzle and into the flowable food material as the edible gaseous material flows into the flowable food material and mixes with the flowable food material, whereby the mixture of flowable food material and edible gaseous material flow into the freeze chamber and flow through the freeze chamber to the exit portion of the freeze chamber, as the mixture of the edible gaseous material and flowable food material is refrigerated by the refrigerant fluid flowing in the helical channel between the inner cylinder and the outer cylinder.

13. Apparatus for producing frozen confection food products from flowable food material and edible gaseous material, comprising: an inner cylinder, the inner cylinder forming a freeze chamber, an outer cylinder encompassing the inner cylinder and coaxial therewith and spaced therefrom, wherein a space is formed between the inner cylinder and the outer cylinder, a helical tubular member positioned in the space between the inner cylinder and the outer cylinder and in engagement with the inner cylinder and the outer cylinder, the helical tubular member having a gas therein, the helical tubular member having spaced-apart convolutions encompassing the inner cylinder and encompassed by the outer cylinder, the inner cylinder and the outer cylinder and the helical tubular member thus forming a helical channel in the space between the inner cylinder and the outer cylinder, a first fluid conductor in communication with the helical channel, a second fluid conductor in communication with the helical channel and spaced from the first fluid conductor, the first fluid conductor conducting refrigerant fluid into the helical channel for flow of refrigerant fluid between the convolutions of the helical tubular member, the second fluid conductor conducting refrigerant fluid from the helical channel, a perforated tube for flow of edible gaseous material, the perforated tube being in fluid communication with the freeze chamber formed by the inner cylinder, a second tube, the second tube being in fluid communication with the freeze chamber and encompassing the perforated tube and adjacent thereto, whereby flowable food material flows through the second tube and is engaged by streams of edible gaseous material flowing from the perforated tube and into the flowable food material which flows between the second tube and the perforated tube, whereby the flowable food material and the edible gaseous material are mixed and expanded in volume, and whereby a mixture of flowable food material and edible gaseous material in an expanded condition flows into the freeze chamber, and mixer means for continued mixing and expansion of the edible gaseous material and the flowable food material within the freeze chamber.

14. The apparatus of claim 13 which includes means forming a passage for flow of the mixture of edible gaseous material and flowable food material from the freeze chamber, the mixer means including a rotatable metering blade, the rotatable mtering blade being adjacent the passage and rotatable to sever portions of the mixture as the portions of the mixture flow from the freeze chamber and into the passage for metering quantities of the mixture which flow into the passage.

15. The apparatus of claim 13, in which the mixer means comprises a stationary fixed elongate stem which has a substantial length within the inner cylinder, and a plurality of augers which rotate about the stationary elongate stem.

* * * * *

UNITED STATES PATENT AND TRADEMARK OFFICE
CERTIFICATE OF CORRECTION

PATENT NO. : 4,758,097

DATED : July 19, 1988

INVENTOR(S) : Robert E. Iles, Sr.

It is certified that error appears in the above-identified patent and that said Letters Patent are hereby corrected as shown below:

Column 7, line 66, change "rial" to ---rials---.

Column 7, line 67, change "chambers" to ---chamber---

Column 9, line 44, change "whreby" to ---whereby---

Column 10, line 39, change "appartus" to ---apparatus---

Column 12, line 28, change "mtering" to ---metering---

Signed and Sealed this

Twenty-fourth Day of January, 1989

Attest:

DONALD J. QUIGG

*Attesting Officer*  *Commissioner of Patents and Trademarks*